United States Patent

Nakajima et al.

[15] 3,670,496
[45] June 20, 1972

[54] EXHAUST GAS AFTER-BURNING SYSTEM

[72] Inventors: Yasuo Nakajima; Yoshimasa Hayashi; Sin-ichi Nagumo, all of Yokohama, Japan

[73] Assignee: Nissan Motor Company, Limited, Yokohama, Japan

[22] Filed: July 27, 1970

[21] Appl. No.: 58,516

[30] Foreign Application Priority Data

July 28, 1969 Japan....................................44/58980

[52] U.S. Cl...........................................................60/288
[51] Int. Cl...........................................................F02b 75/10
[58] Field of Search.................................60/29 A, 29 F, 30 R

[56] References Cited

UNITED STATES PATENTS

| | | | |
|---|---|---|---|
| 2,488,563 | 11/1949 | Sills | 60/29 A |
| 3,083,525 | 4/1963 | Morris | 60/30 R |
| 3,282,046 | 11/1966 | Walker | 60/29 F |
| 3,302,394 | 2/1967 | Pahnke | 60/30 R |
| 3,440,817 | 4/1969 | Saufferer | 60/29 A |

FOREIGN PATENTS OR APPLICATIONS 1,216,496 11/1959 France...................................60/29 A Primary Examiner—Douglas Hart
Attorney—McCarthy, Depaoli, O'Brien & Price

[57] ABSTRACT

An exhaust gas after-burning system for reduction vehicular air pollution without sacrificing engine operating efficiency, which system includes a reactor adapted to function at predetermined operating conditions of the engine in response to variations in vehicle speed and intake manifold vacuum of the engine.

1 Claim, 3 Drawing Figures

EXHAUST GAS AFTER-BURNING SYSTEM

This invention relates to a system for reducing vehicular air pollution, and more particularly to an exhaust gas after-burning system for use in motor vehicles driven by internal combustion engines.

In the operation of gasoline powered internal combustion engines a large quantity of unburned gases are discharged into the atmosphere from exhaust systems of the engines. Such unburned gases contain noxious components such as hydrocarbons and carbon monoxides, causing air pollution in urban areas. To solve this problem, various devices have been developed to promote reoxidation of the unburned hydrocarbons and carbon monoxides in the exhaust system of the engine, including exhaust gas reactors.

The exhaust gas reactor, which is highly effective for reducing air pollution, has a drawback in that the operating efficiency of the engine is significantly reduced thereby. Furthermore, the unburned or partially burned products are corrosive not only to the reactor itself but also to engine parts such as the exhaust valve and exhaust manifold so that maintenance costs of the engine parts will be increased. This is important particularly where the reactor functions all the time during the operation of the engine. Thus, it is necessary for the reactor to be kept operative during predetermined operating conditions of the engine so as to function for a long time with little or no maintenance, and ideally with no replacement of the parts.

It is, therefore, an object of the invention to provide a practical and durable exhaust gas after-burning system.

Another object of the invention is to provide an improved exhaust gas after-burning system of the type having an exhaust gas reactor which functions at predetermined operating conditions of the engine.

Illustrated in the following table are the contents of the unburned hydrocarbons (HC) and carbon monoxides (CO) in the automotive exhaust gases in relation to the operating conditions of the engine, wherein the notations of Ranges A to D correspond to the areas A to D in FIG. 3.

| Operating range of the engine | HC (ppm) | CO (%) |
| --- | --- | --- |
| Range A | 80 – 300 | 0.1 – 2 |
| Range B | Below 100 | Below 0.2 |
| Range C | Below 80 | Below 0.2 |
| Range D | Below 80 | Below 0.1 |

The table shows that the contents of the unburned gases emitted during operating ranges B, C and D may not be so important as that emitted during a typical operating ranges A in which the vehicle is driven at the speed of 80 km/h or higher, or when the intake manifold vacuum of the vehicle engine is 0 to −150 mm Hg.

Thus, the present invention contemplates provision of an exhaust gas after-burning system which functions to reduce air pollution only when the vehicle is running on a city road at relatively low speeds and to maintain high performance of the engine when the vehicle is travelling outside the city a relatively high speed or under heavy load conditions.

Figure 1:
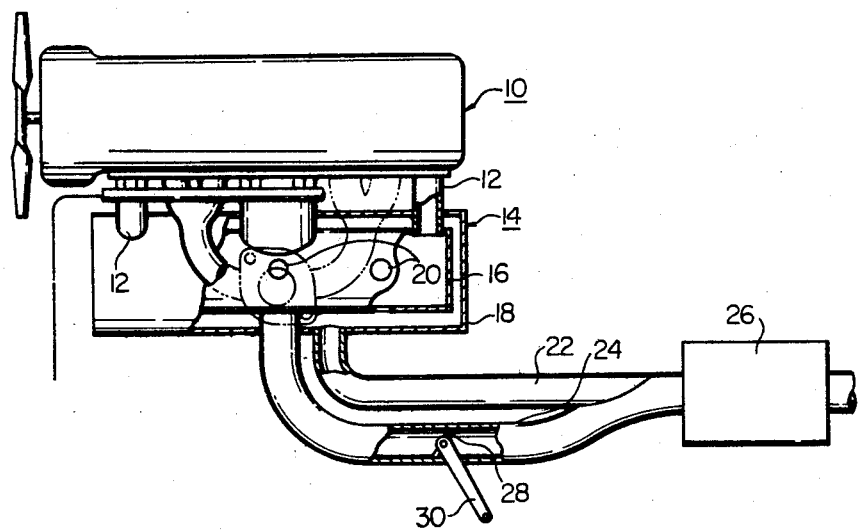
FIG. 1 is a schematic view illustrating an exhaust gas after-burning system embodying the invention.

An example of an exhaust gas after-burning system embodying the invention is illustrated in FIG. 1, the system being shown as incorporated in a common automotive internal combustion engine which is generally shown by numeral 10. The engine 10 is connected to an exhaust manifold 12 which in turn is connected to an exhaust gas reactor 14. The exhaust gas reactor 14 includes an inner casing 16 and an outer casing 18. A plurality of openings 20 are formed in the inner casing 16 for passing the exhaust gases into the outer casing 18.

It is an important feature of the invention that a bypass exhaust pipe is provided for passing the exhaust gases from the inner casing 16 to the atmosphere to establish efficient and smooth engine performance when the vehicle is running at relatively high speeds or under high load conditions. As shown in FIG. 1, a major exhaust pipe 22 is connected to the wall of the outer casing 18, while a bypass exhaust pipe 24 is connected to the wall of the inner casing 16. Both the exhaust pipes 22 and 24 are connected with each other at lower ends thereof and thus communicate with a muffler 26. Provided in the bypass passage 24 is a control valve 28 which is linked with a lever 30. The control valve 28 is adapted to be opened and closed by a suitable control system, as will be described in detail.

Figure 2:
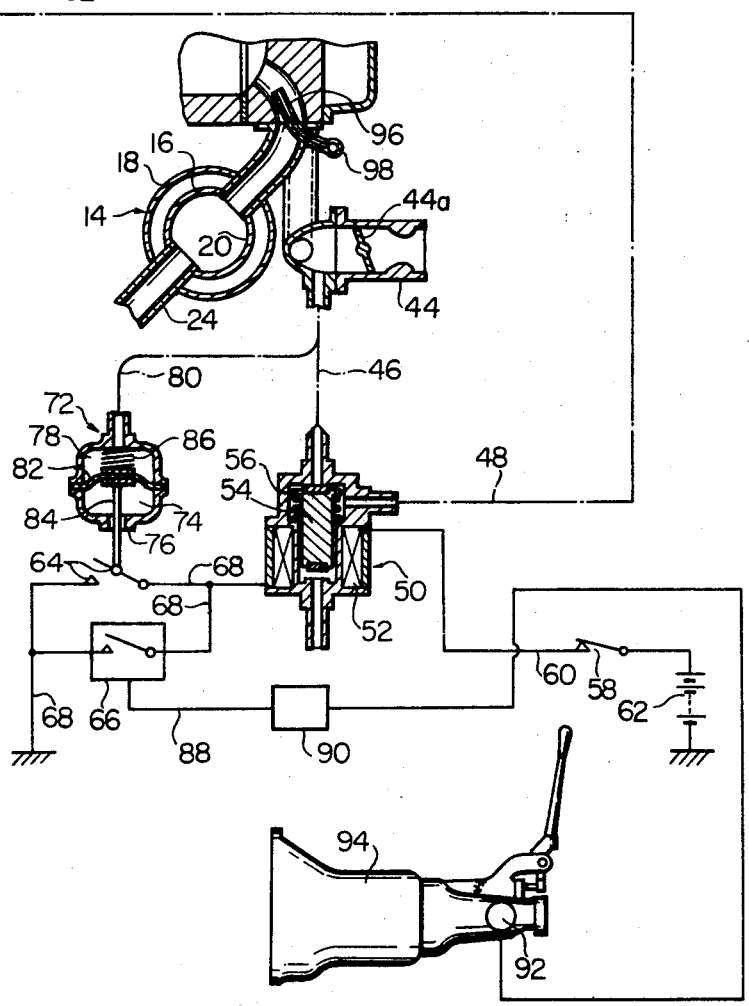
FIG. 2 is a schematic view of a control system for controlling the exhaust gas after-burning system of FIG. 1.

A preferred example of the control system is shown in FIG. 2. As shown, the control system includes an actuator 32, which comprises a cylinder 34 having a fluid chamber 36 therein, a spring 38 provided in the fluid chamber 36, a piston 40 slidably disposed in the fluid chamber 36 and a piston rod 42 which is connected to the lever 30. The fluid chamber 36 of the actuator 32 comcunicates with the carburetor 44 downstream of the carburetor throttle valve 44a through conduits 46 and 48, and functions to move the piston 40 in response to the intake manifold vacuum of the engine against the force of the spring 38. Between the conduits 46 and 48 is provided with a solenoid valve 50 which controls the communication therebetween.

The solenoid valve 50 includes a solenoid coil 52, a moving core or plunger 54 and a valve spring 56. The plunger 54 is normally kept seated so as to block the communication between the conduits 46 and 48 by the force of the valve spring 56. One end of the solenoid coil 52 is connected to an ignition switch 58 through a line 60 which is connected to a power source 62. Another end of the solenoid coil 52 is grounded by a line 68 through parallely connected vacuum switch 64 and speed switch 66.

The vacuum switch 64 is operated by a diaphragm device 72 which is responsive to the intake manifold vacuum of the engine. The diaphragm device 72 has an atmospheric chamber 74 vented to the open air through a port 76 and a vacuum chamber 78 communicating with the downstream side of the carburettor 44 through a conduit 80. The vacuum chamber 78 is hermetically sealed off from the atmospheric chamber 74 by a diaphragm member 82 which is rigidly connected to the vacuum switch 64 by a connecting rod 84. A compression spring 86 is secured to the diaphragm member 82 in the vacuum chamber 78 so that the diaphragm member and accordingly the connecting rod 84 are urged toward a position in which the vacuum switch 64 is closed. The force of the spring 86 is determined so as to overcome a predetermined value of 0 to −150 mm Hg, such as for example, as illustrated in the operating ranges B and C of FIG. 3. Thus, the vacuum switch 64 is normally held in a closed position but, as soon as the vacuum at the downstream of the carburetor exceeds the predetermined value and overcomes the force of the spring 86, then the switch 64 is opened.

The speed switch 66 is connected through a line 88 to a speed detector 90, which in turn is connected to a speed sensor 92 mounted on a transmission 94. The speed sensor 92 is operated by a suitable speed meter pinion (not shown) to sense a vehicle speed and delivers an AC voltage corresponding thereto. The AC voltage derived from the speed sensor 92 is applied to the speed detector 90, which closes the speed switch 66 when the voltage exceeds a predetermined value. For instance, the speed detector 90 may be set to close the speed switch 66 when the vehicle is driven at a speed over 80 km/h as illustrated in the operating ranges C and D of FIG. 3.

Designated by numeral 96 is a nozzle which is adapted to supply a fresh air into the reactor 14 to promote the reoxidation or after-burning of the unburned gases. The nozzle 96 communicates through an inlet pipe 98 with a suitable air pump (not shown).

Figure 3:
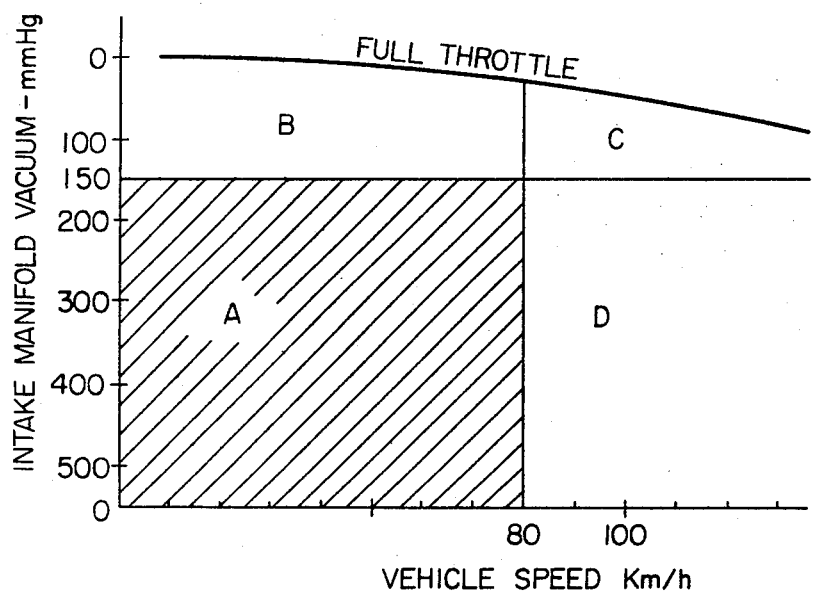
FIG. 3 is a graphical representation of an example of an operating range of an exhaust gas after-burning system of the invention.

When, in operation, the engine is operating under the conditions corresponding to the range A of FIG. 3, the intake manifold vacuum is higher than −150 mm Hg. Accordingly, the diaphragm member 82 of the diaphragm device 72 is moved upwardly against the force of the spring 86, thereby opening the switch 64. Since, in this instance, the vehicle speed is below 80 km/h, the switch 66 is in an open position. Thus, the solenoid coil 52 is kept deenergized, so that the plunger 54 remains in its retracted position by the force of the spring 56, thereby blocking the communicating between the conduits 46 and 48. The piston 40 is therefore held in its rightmost position by the force of the spring 38, whereby the control valve 28 is set into closed position.

The exhaust gases passed through the exhaust manifold 12 are then introduced into the inner casing 16 of the reactor 14, there the reoxidation of the unburned hydrocarbons and carbon monoxides takes place. The exhaust gases thus reoxidized are passed through the ports 20 into the outer casing 18 of the reactor 14 and thereafter into the muffler 26 through the main pipe 22. Additional air required for the reoxidation of the unburned gases is introduced into the reactor 14 from the air pump through the inlet pipe 98 and nozzle 96. It will be appreciated that the unburned hydrocarbon and carbon monoxide contents in the exhaust gases can be effectively reduced to about one-third to one-sixth when the engine is operating under the conditions falling in the range A as shown in FIG. 3.

When, now, the intake manifold vacuum becomes lower than the predetermined value of, for instance, −150 mm Hg, the vacuum in the chamber 78 of the diaphragm device 72 approaches to the atmospheric pressure, so that the diaphragm member 82 is moved downwardly by the force of the spring 86 thereby closing the switch 64. At this time, the solenoid coil 52 is energized so that the plunger 54 is moved downwardly, thereby establishing a communication between the conduits 46 and 48. The intake manifold vacuum is, therefore, passed into the chamber 36 of the actuator 32 through the conduits 46 and 48, thereby displacing the piston 40 leftwardly of the drawing to open the control valve 28. In this instance, the exhaust gases passed through the exhaust manifold 12 are directed to the muffler 26 mostly through the bypass pipe 24 so that the pressure rise resulting from the operation of the reactor is effectively reduced. Thus, the engine can be operated at a high performance.

When the vehicle speed exceeds a predetermined level which may be 80 km/h, for instance, the detector 90 detects the speed and thereby closes the switch 66, so that the solenoid coil 52 is energized. Accordingly, the control valve 28 is opened in the manner as previously described. The exhaust gases discharged into the outer casing 18 may mostly flow into the muffler 26 through the bypass pipe 24 so that the undesirable pressure rise will be eliminated. Thus, in the operating ranges B, C, and D where the recombustion of the exhaust gases is not so important, the either or both of the switches 64 and 66 are closed to open the control valve 28 in the bypass pipe 24. This ensures to effectively promote engine performance.

It will be appreciated from the foregoing that, in accordance with the invention, the exhaust gases may be effectively cleaned with least deterioration in the engine output and in the durability of the reactor.

What is claimed is:

1. An exhaust gas after-burning system for an automotive internal combustion engine comprising:
   A. a reactor for oxidizing exhaust gases, said reactor having an inner casing and an outer casing;
   B. a main exhaust pipe connected to said outer casing of said reactor;
   C. a bypass exhaust pipe connected to said inner casing of said reactor;
   D. control valve means provided in said bypass exhaust pipe for controlling the flow path of the exhaust gases; and
   E. control means, for opening and closing said control valve in response to variations in vehicle speed and intake manifold vacuum of the engine, comprising:
      1. an actuator communicating with a point downstream of a carburetor and adapted to be actuated by the intake manifold vacuum,
      2. a solenoid valve provided between said actuator and said point downstream of the carburetor for controlling the communication therebetween,
      3. a vacuum switch electrically connected to said solenoid valve for controlling the operation of said solenoid valve, said vacuum switch being adapted to be operated by the intake manifold vacuum, and
      4. a speed switch responsive to the vehicle speed, said speed switch being connected in parallel with said vacuum switch, whereby said solenoid valve is operated in response to the intake manifold vacuum and vehicle speed to actuate said actuator.

* * * * *